United States Patent
Sellers

(10) Patent No.: US 6,633,986 B1
(45) Date of Patent: Oct. 14, 2003

(54) LIQUID SPILL-SENSING KEYBOARD WHICH SHUTS DOWN WHEN A LIQUID SPILL IS DETECTED

(75) Inventor: Charles A. Sellers, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/523,751

(22) Filed: Mar. 13, 2000

(51) Int. Cl.[7] ................................. G06F 1/26
(52) U.S. Cl. .................. 713/300; 340/604; 400/472
(58) Field of Search .................. 713/300; 307/318; 400/496; 341/20

(56) References Cited

U.S. PATENT DOCUMENTS

| | | | | |
|---|---|---|---|---|
| 4,948,281 A | * | 8/1990 | Werner | 400/472 |
| 5,196,729 A | * | 3/1993 | Thorngren | 307/118 |
| 5,734,136 A | * | 3/1998 | Newcomer et al. | 200/5 A |
| 5,810,491 A | * | 9/1998 | Muller et al. | 400/496 |
| 6,054,939 A | * | 4/2000 | Wei et al. | 341/20 |
| 6,229,229 B1 | * | 5/2001 | Sharp | 307/118 |
| 6,308,728 B1 | * | 10/2001 | Frazier | 137/312 |

* cited by examiner

*Primary Examiner*—Thomas Lee
*Assistant Examiner*—Mark Connolly

(57) ABSTRACT

The keyboard portion of a notebook computer has incorporated in its key switch membrane section a liquid detection electrical circuit with a series of normally open detection switch structures positioned be contacted and shorted out by liquid spilled on the keyboard. A spilled liquid short-circuiting of any of these normally open membrane switch structures during operation of the computer automatically creates a liquid spill output signal that is responsively utilized to shut down the computer before its system electronics can be contacted, short-circuited and damaged by liquid spilled on the keyboard and entering the interior of the computer therethrough.

5 Claims, 2 Drawing Sheets

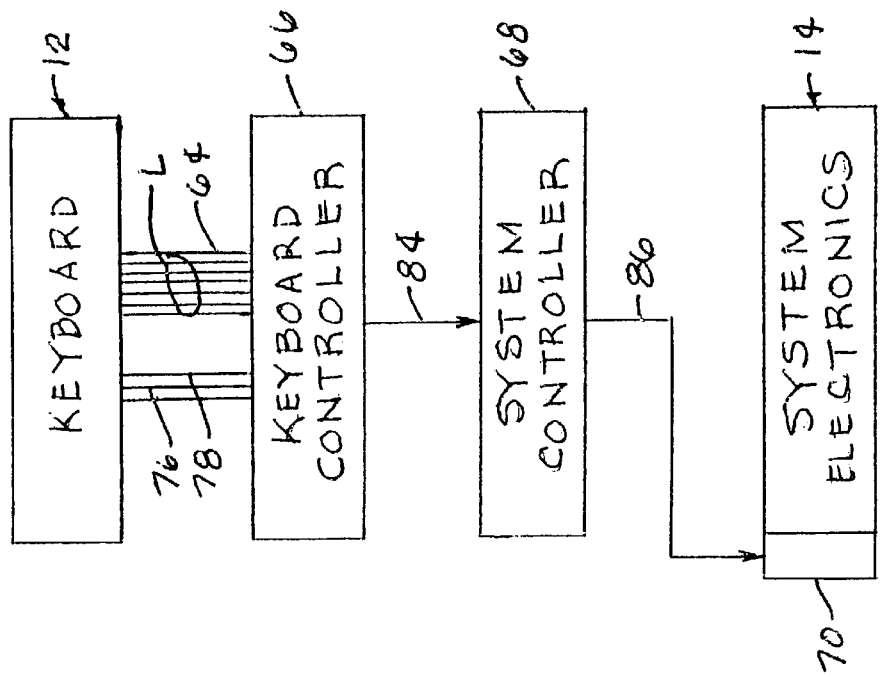
FIG. 5
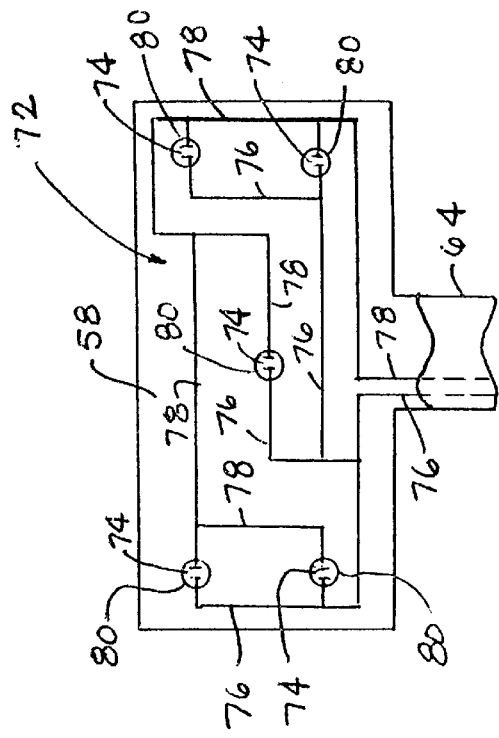
FIG. 3
FIG. 4

_US 6,633,986 B1_

LIQUID SPILL-SENSING KEYBOARD WHICH SHUTS DOWN WHEN A LIQUID SPILL IS DETECTED

BACKGROUND OF THE INVENTION

1. Field of the Invention

The present invention generally relates to keyboard structures used in electronic apparatus and, in a preferred embodiment thereof, more particularly relates to a specially designed liquid spill-sensing keyboard assembly operatively incorporated in a notebook computer.

2. Description of Related Art

During use of a portable notebook computer resting atop a desk or other horizontal support surface (such as an airplane seat tray), the keyboard portion of the computer is susceptible to having a drink liquid (such as coffee, water or a soft drink) spilled on it by it by the computer user. If some measure is not taken to prevent the spilled liquid from flowing from the keyboard onto to the underlying major internal electrical components of the computer (such as the circuit boards, drives and the like) these components, commonly referred to as the "system electronics" can be shorted out by the spilled liquid and severely damaged.

Typically, portable computer keyboard and associated electrical system designs incorporate some means for either (1) sealing off areas of the keyboard/system to prevent the spilled liquid from reaching the underlying system electronics, (2) absorbing and containing the spilled liquid, or (3) diverting the spilled liquid from the keyboard to a safe place in the computer where it will not short out the system electronics therein.

For example, where a liquid sealing technique is employed the keyboard installs into an opening in the portable computer with a rubber/plastic gasket which is designed to prevent liquid spills on the top surface of the keyboard from draining therefrom into the interior of the computer. In the absorption approach the bottom or perimeter of the keyboard is equipped with an absorbing material (functioning as a "diaper") which absorbs and retains the liquid spilled on the top side of the keyboard. When the diverting approach is used the liquid is allowed to pass through or around the keyboard, via built-in "channeling" passages, in specific areas to drain the liquid into a location isolated from the computer system electronics underlying the keyboard.

Ensuring a tight liquid keyboard seal in a computer production environment is difficult, and absorbing or diverting liquids spilled on the keyboard undesirably adds extra cost and space requirements for these features. In view of this it can readily be seen that a need exists for apparatus that protects the computer system electronics from short circuit damage arising from a spillage of liquid on the keyboard in a manner avoiding or at least substantially reducing the above-mentioned problems, limitations and disadvantages typically associated with conventional liquid spillage sealing, absorbing and diverting techniques applied to portable computer keyboards.

SUMMARY OF THE INVENTION

In carrying out principles of the present invention, in accordance with a preferred embodiment thereof, an electronic apparatus, representatively a portable computer notebook computer, is provided with a specially designed liquid spill sensing keyboard which is operative to sense the presence of liquid spilled on the keyboard and responsively shut down the computer's system electronics before they can be contacted, shorted out and damaged by the spilled liquid.

The keyboard is carried on the top side of the base housing portion of the portable computer and is preferably provided with electrical liquid spill detection circuitry having a portion positioned and configured to be contacted and shorted out by liquid spilled on the keyboard. In response, the shorted out detection circuitry creates a liquid spill detection signal which is used to shut down the system electronics. Illustratively, the detection circuitry portion positioned to be contacted and shorted out by the spilled liquid includes a spaced plurality of electrically interconnected normally open switch structures incorporated in a multi-laver signal pad portion of the keyboard which underlies the depressible keys thereof and is interposed between the keys and the underlying system electronics in the base housing of the computer.

In a preferred embodiment of the keyboard, the multi-layer signal pad has a top layer, a second layer disposed beneath the top layer and having a top side facing the top layer, and a spaced series of openings extending downwardly through the top layer to portions of the second layer top side, and fluid tight seal structures laterally circumscribing the openings. The normally open switch structures are carried on the top side portions of the second layer, exposed at the bottom ends of the pad openings, and are operative to be contacted and shorted out by liquid entering the openings.

The detection circuitry incorporated in the multi-layer signal pad is representatively coupled to a keyboard controller, and a system controller is operatively interconnected between the keyboard controller and a power supply portion of the system electronics. When liquid spilled on the keyboard passes through openings in the support structure which carries the depressible key members it enters at least one of the top side signal pad openings and shorts out the associated normally open detection switch structure(s). The spilled liquid signal is responsively transmitted from the keyboard controller to the system controller which, in turn, transmits a shut-down signal to the power supply portion of the system electronics, thereby shutting off the computer before its system electronics can be contacted, shorted out and damaged by the spilled liquid.

BRIEF DESCRIPTION OF THE DRAWINGS

FIG. 3 is an enlarged scale simplified top plan view of a portion of a signal pad structure incorporated in the keyboard;

FIG. 4 is a schematic diagram of a liquid spill-sensing circuitry portion the keyboard; and FIG. 5 is a block diagram schematically illustrating the interconnection of the keyboard, a keyboard controller, a system controller, and the system electronics.

DETAILED DESCRIPTION

Figure 1:
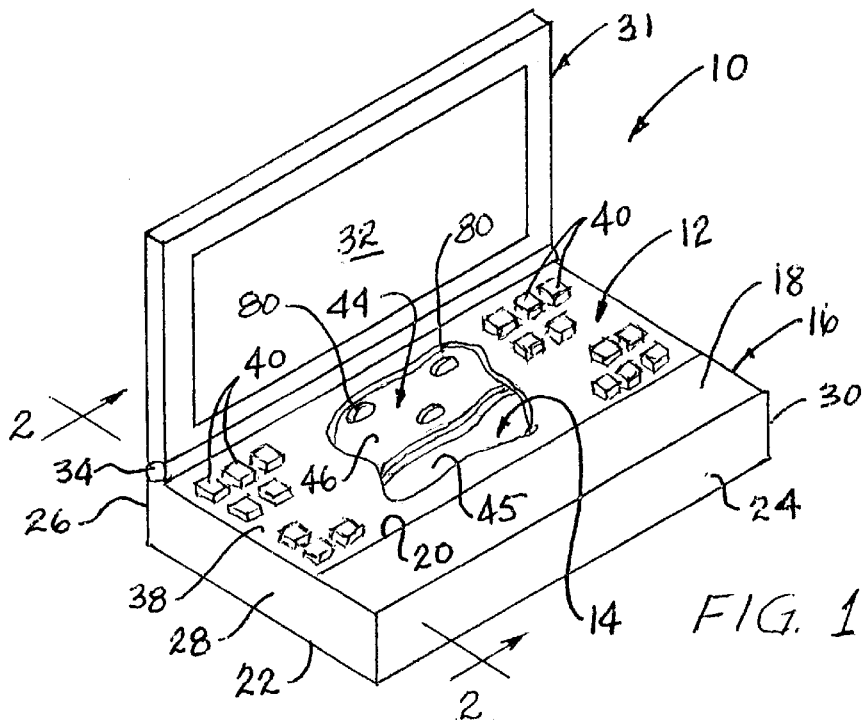
FIG. 1 is a simplified, partially cut away perspective view of a representative notebook computer having incorporated therein a specially designed liquid spill-sensing keyboard embodying principles of the present invention.

Referring initially to FIG. 1, the present invention provides an electronic apparatus 10 which is representatively in the form of a portable notebook computer. The notebook computer 10 has incorporated therein a specially designed liquid spill-sensing keyboard 12 embodying principles of the present invention. As will be subsequently described herein, during use of the computer 10 the keyboard 12 functions, in response to a liquid spilled on it, to automatically shut down the computer 10 to prevent the spilled liquid from causing electrical short circuit damage to the computer's system electronics 14 that generally underlie the keyboard 12.

Computer 10 includes a hollow rectangular base housing 16 having a top horizontal side wall 18 with a rectangular opening 20 therein; a bottom horizontal side wall 22; front and rear vertical side walls 24 and 26, and left and right vertical end walls 28 and 30. A hollow rectangular lid housing 31, having a display screen 32 on its front or inner side, is pivotally secured along a hinge joint 34 to a top rear corner portion of the base housing 16. Lid housing 31 may be upwardly pivoted to place the computer 10 in an open use orientation (FIG. 1) in which the top side 18 of the base housing 16 is exposed and the display screen 32 forwardly faces the user of the computer, or downwardly pivoted to place the computer 10 in a closed storage and transport orientation (not shown) in which the lid housing 31 extends across and covers the top 18 of the base housing 16. Suitable latch means (not shown) are provided to releasably retain the lid housing 31 in its closed orientation.

Figure 2:
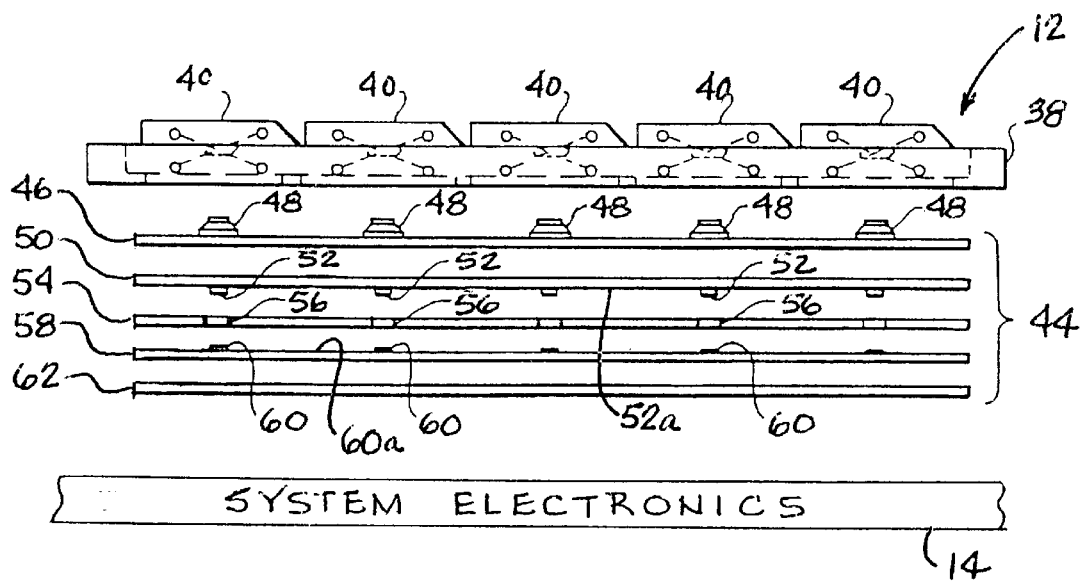
FIG. 2 is an exploded schematic cross-sectional view through the keyboard, and the underlying system electronics, taken generally along line 2—2 of FIG. 1.

The keyboard 12 is received in and extends across the top side opening 20 in the base housing 16 and occupies only a relatively small upper portion of the interior of the base housing. Referring now additionally to FIG. 2, the keyboard 12 basically comprises a relatively thin rectangular monoblock support structure 38 that horizontally extends across the base housing top side opening 20 and is suitably anchored to the base housing 16; a series of manually depressible keys 40 operatively carried by the support structure 38; and a rectangularly configured, multilayer signal pad structure 44 that underlies the support structure 38. The system electronics 14 that underlie the keyboard 12 include, for example, a system motherboard 45, drive units (not shown) and a variety of other conventional electrical components (also not shown).

Signal pad structure 44 (see FIG. 2), which except as noted below is of a generally conventional construction, is suitably supported in an underlying relationship with the monoblock support structure 38 and includes, from top to bottom, (1) a plastic dome sheet 46 having a spaced series of rubber key return domes 48 projecting upwardly from its top side, with each dome 48 underlying one of the keys 40; (2) a plastic top circuit sheet 50 having a spaced series of circular, electrically conductive pads 52 disposed on its bottom side, aligned with the domes 48, and connected to surface trace circuitry 52a formed on the bottom side of the sheet 50; (3) a plastic spacer sheet 54 having a spaced series of circular openings 56 formed therein and underlying the pads 52 in registry therewith; (4) a plastic bottom circuit sheet 58 having a spaced series of circular, electrically conductive pads 60 disposed on its top side, aligned with the spacer sheet openings 56, and connected to surface trace circuitry 60a formed on the top side of the sheet 58; and (5) a metal backing sheet 62. Sheets 50, 54 and 58 are suitably sealed to one another around their peripheries to prevent entry of liquid into the spaces between adjacent sheet pairs.

In a conventional manner, when a given key 40 is depressed it downwardly deforms the underlying resilient return dome 48 to, in turn, drive the underlying key switch pad 52 downwardly into engagement with its facing key switch pad 60. This operatively interconnects portions of the trace circuitry 52a,60a and responsively generates a corresponding keystroke signal, via leads L connected to the trace circuitry 52a,60a and disposed on an outwardly projecting flexible "tail" or ribbon cable portion 64 of the signal pad structure 44, to a keyboard controller 66 (see FIG. 5) operatively connected to the cable portion 64. As schematically illustrated in FIG. 5, keyboard controller 66 is coupled to a system controller 68 which, in turn, is coupled to a power supply portion 70 of the system electronics 14. In a conventional manner, the generation of this keystroke signal is used to generate the associated keystroke character on the display screen 32.

Referring now to FIGS. 3 and 4, in accordance with a primary aspect of the present invention, the keyboard 12 is provided with specially designed liquid spill-detection circuitry 72 which functions to sense the presence of liquid spilled on the keyboard 12 and responsively shut down the system electronics 14 before the spilled liquid can contact them and cause electrical short circuit damage thereto.

The liquid spill-detection circuitry 72 comprises electrical trace circuitry formed on the top side of the bottom circuit sheet portion 58 of the signal pad structure 44 and including a spaced series of normally open liquid detection switch structures 74 each having spaced apart positive and negative contact portions 74a and 74b. The positive switch portions 74a are all connected to a surface trace lead 76 which extends along the top surface of the bottom circuit sheet 58 and through the ribbon cable portion 64. In a similar manner, the negative switch portions 74b are all connected to a surface trace lead 78 which extends along the top surface of the bottom circuit sheet 58 and through the ribbon cable portion 64. Since all of the switch structures 74 are normally open, the positive and negative leads 76,78 are normally electrically isolated from one another.

Each positive and negative switch portion set 74a,74b lies at the bottom of one of a spaced series of representatively circular liquid receiving openings 80 extending downwardly through the dome sheet 46 to the top side of the bottom circuit sheet 58. Circumscribing each opening 80 is a liquid seal area 82 which secures facing circular areas of each adjacent pair of the signal pad structure sheets 50,54,58 to one another in a manner preventing liquid entering any of the openings 80 from flowing outwardly between any facing pair of such sheets and coming into contact with the previously described key switch trace circuits 52a and 60a. Representatively, these seal areas 82 are adhesive seal areas.

In the event that liquid is spilled on the top side of the keyboard 12 it flows downwardly through the key openings in the monoblock support structure 38 and comes in contact with the top side of the dome sheet 46. The spilled liquid then flows downwardly through at least one of the spaced apart liquid-receiving openings 80 and electrically shorts out the spaced apart switch portions 74a,74b at the bottom of the opening. This shorting out of the switch portions 74a and 74b, in turn, electrically couples the positive and negative leads 76,78 and thereby causes the keyboard controller 66 (see FIG. 5) to transmit a "spilled liquid" signal 84 to the system controller 68. Upon receipt of the signal 84, the system controller 68 responsively transmits a system shutdown signal 86 to the power supply portion 70 of the system electronics 14, thereby terminating electrical power supply to the system electronics 14, thus protecting them against electrical short circuit damage in the event that the spilled liquid reaches them.

As can be seen from the foregoing, the spill-detecting keyboard 12 of the present invention protects the system electronics 14 from liquid-created electrical short circuit damage in a simple, reliable and inexpensive manner without the previous necessity of either (1) sealing off areas of the keyboard/system to prevent the spilled liquid from reaching the underlying system electronics, (2) absorbing and containing the spilled liquid, or (3) diverting the spilled liquid from the keyboard to a safe place in the computer where it will not short out the system electronics therein.

While the present invention has been representatively illustrated and described as being incorporated in a notebook computer keyboard, it will be readily appreciated that it could be alternatively associated with the data input key structures of a variety of other types of electronic apparatus including, but not limited to, calculators and other types of computer keyboards such as desktop computer keyboards.

The foregoing detailed description is to be clearly understood as being given by way of illustration and example only, the spirit and scope of the present invention being limited solely by the appended claims.

What is claimed is:

1. Electronic apparatus comprising:

system electronics; and a keyboard having associated therewith electrical liquid spill detection circuitry coupled to said system electronics;

said electrical liquid spill detection circuitry, in response to being contacted by liquid spilled on said keyboard during operation of said electronic apparatus, automatically functioning to shut down said system electronics;

said keyboard comprising a multi-layer signal pad structure having a top layer, a second layer disposed beneath said top layer and having a top side facing said top layer, an opening extending downwardly through said top layer to a portion of said top side, and a fluid tight seal structure laterally circumscribing said opening, and said electrical spill detection circuitry comprising a normally open switch structure carried on said top side portion of said second layer and operative to be contacted and shorted out by liquid entering said opening.

2. Keyboard apparatus useable in conjunction with an electronic device having system electronics, said keyboard apparatus comprising:

a support structure;

a series of depressible key members carried on said support structure;

electrical liquid spill detection circuitry operative to be contacted by liquid spilled on said support structure and responsively output a spilled liquid signal useable to shut down said system electronics;

said keyboard apparatus further comprises a multi-layer signal pad structure underlying said support structure and operative to output an electrical keystroke signal in response to depression of one of said key members;

said liquid spill detection circuitry has at least one normally open switch structure carried by said signal pad structure and being positioned to be contacted and shorted out by liquid spilled on said support structure;

said multi-layer signal pad structure has a top layer, a second layer disposed beneath said top layer and having a top side facing said top layer, an opening extending downwardly through said top layer to a portion of said top side, and a fluid tight seal structure laterally circumscribing said opening, and said at least one normally open switch structure is carried on said top side portion of said second layer and operative to be contacted and shorted out by liquid entering said opening.

3. The keyboard apparatus of claim 2 wherein said seal structure adhesively secures facing layer portions together around the lateral periphery of said opening.

4. A portable computer comprising:

a base housing having a top side;

system electronics disposed within said base housing;

a keyboard carried on said top side of said base housing above at least a portion of said system electronics and including:

a support structure;

a series of depressible key members carried on said support structure;

electrical liquid spill detection circuitry operative to be contacted by liquid spilled on said keyboard and responsively output a spilled liquid signal;

apparatus interconnected between said keyboard and said system electronics and operative to receive said spilled liquid signal and responsively shut down said system electronics;

said keyboard further includes a multi-layer signal pad structure underlying said support structure and operative to output an electrical keystroke signal in response to depression of one of said key members;

said liquid spill detection circuitry has at least one normally open switch structure carried by said signal pad structure and being positioned to be contacted and shorted out by liquid-spilled on said keyboard;

said multi-layer signal pad structure has a top layer, a second layer disposed beneath said top layer and having a top side facing said top layer, an opening extending downwardly through said top layer to a portion of said top side, and a fluid tight seal structure laterally circumscribing said opening, and said at least one normally open switch structure is carried on said top side portion of said second layer and operative to be contacted and shorted out by liquid entering said opening.

5. The portable computer of claim 4 wherein said seal structure adhesively secures facing layer portions together around the lateral periphery of said opening.

* * * * *